(12) United States Patent
Gianotti et al.

(10) Patent No.: US 6,481,131 B2
(45) Date of Patent: Nov. 19, 2002

(54) LED ILLUMINATED PLAQUE

(76) Inventors: Amanda Gianotti, 44 Chesterfield Ct., Monkton, MD (US) 21111; Michael David, 7834 Main Falls Cir., Baltimore, MD (US) 21228; Wayne Kirchner, 9611 Dixon Ave., Baltimore, MD (US) 21234

( * ) Notice: Subject to any disclaimer, the term of this patent is extended or adjusted under 35 U.S.C. 154(b) by 0 days.

(21) Appl. No.: 09/823,686

(22) Filed: Mar. 31, 2001

(65) Prior Publication Data

US 2002/0139023 A1 Oct. 3, 2002

Related U.S. Application Data

(60) Provisional application No. 60/237,424, filed on Oct. 3, 2000.

(51) Int. Cl.$^7$ ................................................. G09F 13/18
(52) U.S. Cl. ......................................... 40/546; 362/812
(58) Field of Search ............................ 40/546; 362/812, 362/31

(56) References Cited

U.S. PATENT DOCUMENTS

| | | | | |
|---|---|---|---|---|
| 2,091,342 A | * | 8/1937 | Van Bloem | 40/546 |
| 4,644,164 A | * | 2/1987 | Mudge | 250/353 |
| 5,276,591 A | | 1/1994 | Hegarty | |
| 5,433,024 A | * | 7/1995 | Lerner | 40/546 |
| 5,550,715 A | | 8/1996 | Hawkins | |
| 5,576,078 A | | 11/1996 | Schatz | |
| 5,636,914 A | | 6/1997 | Trusiani | |
| 5,743,616 A | | 4/1998 | Giuliano | |
| 5,775,791 A | | 7/1998 | Yoshikawa | |
| 5,842,297 A | * | 12/1998 | Tung | 40/546 |
| 6,036,328 A | | 3/2000 | Ohtsuki | |
| 6,073,374 A | * | 6/2000 | Tingmo | 40/546 |

FOREIGN PATENT DOCUMENTS

| | | | | |
|---|---|---|---|---|
| GB | 2113882 | * | 8/1983 | 40/546 |

* cited by examiner

*Primary Examiner*—Cassandra Davis
(74) *Attorney, Agent, or Firm*—Law Offices of Royal W. Craig

(57) ABSTRACT

An aesthetically striking memento comprising an edge-lit translucent panel having an inscribed design, and a free-standing compact base unit with integral LED edge-lighting system. The compact base unit includes an LED light source for reflecting light upward into the translucent panel. The plaque generally comprises an acrylic panel inscribed with a reverse design on its rear face with text, logos and/or graphics and which seats within a recessed cavity in the compact base unit. A reflective material lines the floor of the cavity and surrounds a series of LEDs spaced lengthwise along the slot at the bottom of the cavity. An integral battery or A/C power receptacle provides power to the LEDs through a switch located in the compact base unit. When illuminated, the LEDs emit light upward into the translucent acrylic panel. The light is reflected forwardly from the inwardly-inscribed design and outward to a viewer, thereby accentuating the inscribed indicia carried on the panel.

12 Claims, 5 Drawing Sheets

LED ILLUMINATED PLAQUE

CROSS-REFERENCE TO RELATED APPLICATIONS

The present application derives priority from U.S. Provisional Patent Application No. 60/237,424 for "LED ILLUMINATED PLAQUE" filed Oct. 3, 2000.

BACKGROUND OF THE INVENTION

1. Field of the invention

The present invention relates to trophies, awards and plaques and, more particularly, to an aesthetically striking memento comprising an edge-lit translucent acrylic panel having an inscribed design, and a free-standing base with integral LED edge-lighting system.

2. Description of the Background

Trophies and plaques are commonly awarded to recognize an individual's achievement or service. Acrylic presents a medium well known in the field for making trophies and plaques. Acrylic awards may comprise free-standing acrylic panels or may combine a base structure which provides a mounting surface for the transparent acrylic panel. The acrylic panel can be inscribed with text, logos and/or graphics identifying the recipient, the group or organization presenting the award, the date of the award, the reason for the award, etc.

Acrylic panels provide a distinctive and stylish alternative to the traditional trophy or plaque. Under proper lighting conditions, the indicia provide sufficient contrast with the smooth surface of the acrylic panel to enable one to read the textual inscriptions and discern the logos or graphics. However, in dim lighting or in darkness the inscriptions on an acrylic award are not legible.

Edge-lighting is a well-known method for illuminating other types of display screens. Products that benefit from the technique vary widely from handheld computing devices, liquid crystal televisions, personal computers, to artwork and ornaments, and directional signs (e.g. "Exit").

There are a number of known methods for illuminating flat display panels by means of edge-lighting. For example, U.S. Pat. No. 5,276,591 to Hegarty teaches the use of LEDs to inject light into the edge of a translucent graphic panel. Hegarty, however, teaches placing a graphic mask on the front of a translucent panel instead of engraving indicia on the rear of a panel. Hegarty teaches cutting the border of the acrylic panel to the shape of the graphic mask, and illuminating the image of the graphic mask, but does not claim a method for lighting the etched contours of the acrylic itself. Further, the object of the Hegarty invention is to create a durable and efficient illuminated sign as commonly used to mark exits in buildings.

U.S. Pat. No. 5,636,914 to Trusiani teaches an edge-lit illuminated panel device with a cut pictorial representation in an acrylic material. Trusiani, however teaches a method of through-cutting the panels which differs from the etching taught by the present invention. Gaps in Trusiani's line drawings bridge the uncut areas of the panels to maintain the integrity of the panel as a whole. Trusiani's through-cutting method limits the graphic representations to line drawings, and precludes the use of ornamental graphics and logos suitable for adorning a trophy or plaque as contemplated by the present invention. Further, Trusiani does not teach a plurality of LEDs as a light source, but teaches more generally "strip light(s) . . . light bulbs, (or) a fiber-optic light source. . .". The object of the Trusiani invention is to create a panel suitable for maps or other simple line-drawn pictorial representations.

By adaptation of the foregoing, it would be of great advantage to employ an edge-lighting concept in the base of an acrylic award to illuminate the inscriptions in the acrylic. The edge-lighting would highlight the inscribed indicia even under bright light conditions, creating a more interesting and inviting design that attracts the attention of observers.

SUMMARY OF THE INVENTION

It is, therefore, an object of the present invention to accentuate the inscribed design in the surface of an acrylic panel by edge-lighting.

It is another object to project light along the plane of a translucent acrylic panel orthogonally toward the sidewalls of text, logos, and/or graphics that have been laser-cut, rotary engraved, sandblasted, or burnished into the rear surface of said panel in order to refract the light outward toward someone viewing the panel, thereby presenting a light-accentuated image of the text, logos, and/or graphics.

It is another object to provide a free-standing base for seating the acrylic panel as described above into a slotted receptacle contained within a compact base unit to support the panel.

It is yet another object to provide a compact and aesthetically pleasing free-standing base as described above that incorporates a series of LEDs, positioned within the above described slotted receptacle, so as to direct light upward into the acrylic panel.

A still further object of the invention is to incorporate alternative power sources comprised of an integral battery with a current limiting resistor, and an A/C power receptacle, said power sources actuated by a switch on the base unit.

According to the present invention, the above-described and other objects are accomplished by positioning a plurality of LEDs within the compact base unit of an acrylic plaque to illuminate the inscribed indicia carried by a translucent acrylic panel. In accordance with an aspect of the invention, the acrylic plaque comprises a compact base unit which may be made of wood, plastic, metal, stone, acrylic or a combination thereof. The base unit is equipped with an integral battery and a current limiting resistor connected to a plurality of LEDs. In addition, the compact base unit is outfitted with a receptacle for use with an A/C power supply, and a switch that enables the light source to be turned on or off at the discretion of the user. In accordance with another aspect of the invention, the LEDs are mounted in a slotted receptacle in the compact base unit comprising a floor surface lined with a reflective material to direct the light upward into the translucent acrylic panel. The LEDs are offset towards the front of the base unit so that the reverse inscribed elements of the acrylic panel are struck by the evenly diffused light emitted from the LEDs, thereby illuminating the inscribed indicia rather than illuminating the entire face of the acrylic panel. The panel's laser-cut, rotary engraved, sandblasted, or burnished text, logo and/or graphics are greatly enhanced by the edge-lighting. In accordance with another aspect of the invention, the side and top borders of the panel are frosted to give a glowing effect when lit from within. The frosting on the lower border diffuses the beams of light cast by the LEDs before the light passes upward through the acrylic panel. The effect of the edge-lighting is visible under a range of lighting conditions, and improves both the legibility and aesthetics of the plaque. by adding a soft glow to the inscribed indicia.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
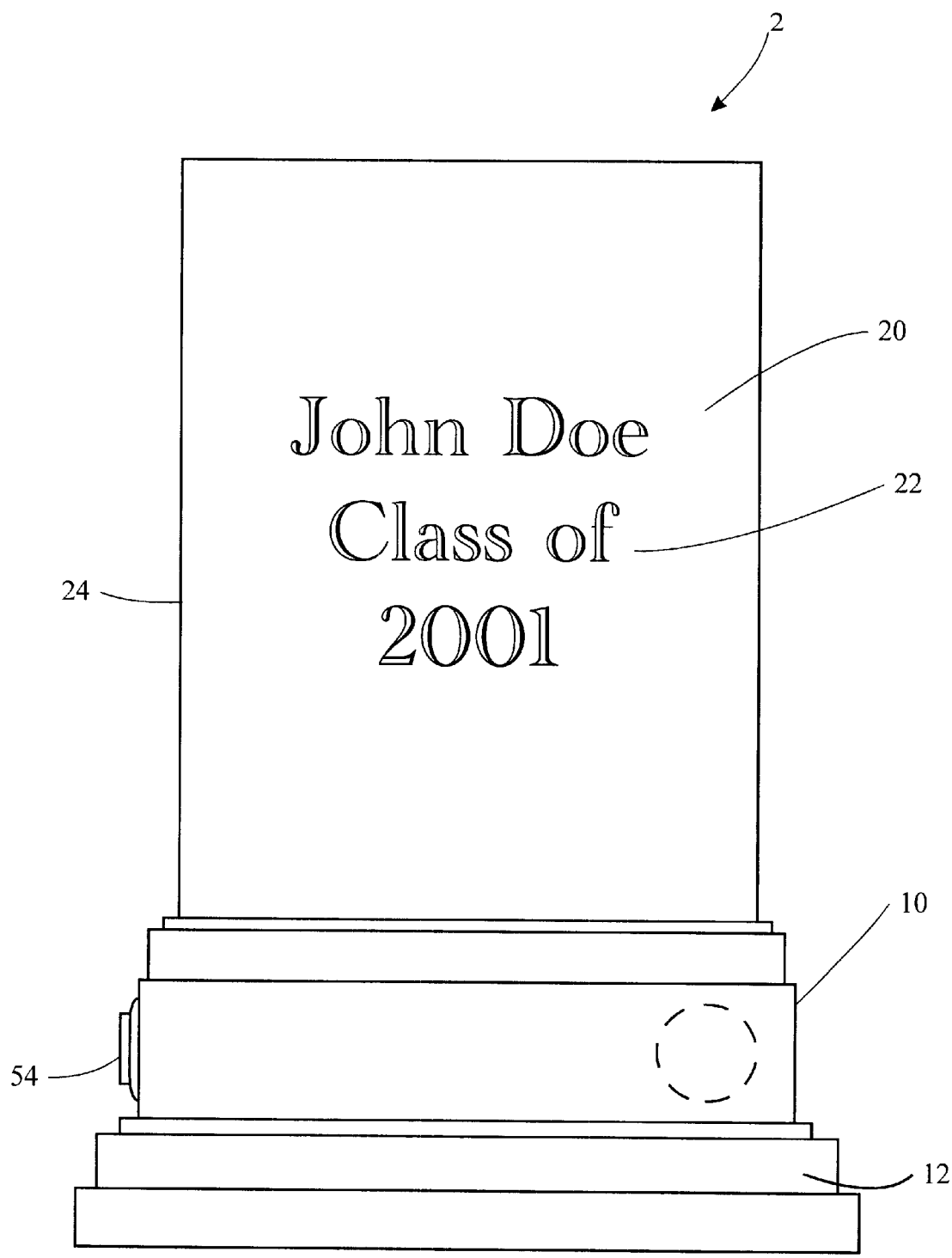
FIG. 1 is a front perspective view of the LED illuminated plaque 2 inclusive of compact base unit 10 and the LED illuminated acrylic panel 20 according to a first embodiment of the present invention.

FIG. 1 is a front pespective view of an LED illuminated plaque 2 according to a first embodiment of the present invention in which an inscribed translucent acrylic panel 20 is supported by a hollow block shaped compact base unit 10 in which the operative electrical circuitry and LEDs are housed (as will be described). The compact base unit 10 is closed at the bottom by (and rests atop) a base plate 12, perpendicular to the acrylic panel 20. The base plate 12 is attached to the lower surface of the compact base unit 10 by conventional wood screws or the like. The base plate 12 extends slightly beyond the perimeter of the compact base unit 10 providing increased lateral, anterior, and posterior support for the plaque 2. The translucent acrylic panel 20 is comprised of a solid planar piece of acrylic, the thickness of which may vary according to the design of the award. Text, logos, and/or graphics/designs are laser-cut, rotary engraved, sandblasted, or burnished in reverse on the rear face of the panel 20. For example, the illustrated acrylic panel 20 reveals two lines of text 22 centrally inscribed on the rear side of the panel 20, the text reversed so that it reads, from left to right when viewed from the front of the panel 20. The inscription process creates negative contours within the acrylic panel 20 which capture and radiate the light giving a glowing effect to the indicia, without illuminating the uncarved face of the panel 20. The sides and upper peripheral borders 24 of the acrylic panel 20 are preferably frosted to capture the light emitted by the LEDs creating an aesthetically pleasing frame of light along the three visible borders 24. The light emitted by the LEDs is diffused as it passes through the lower peripheral border (not shown in FIG. 1).

Figure 2:
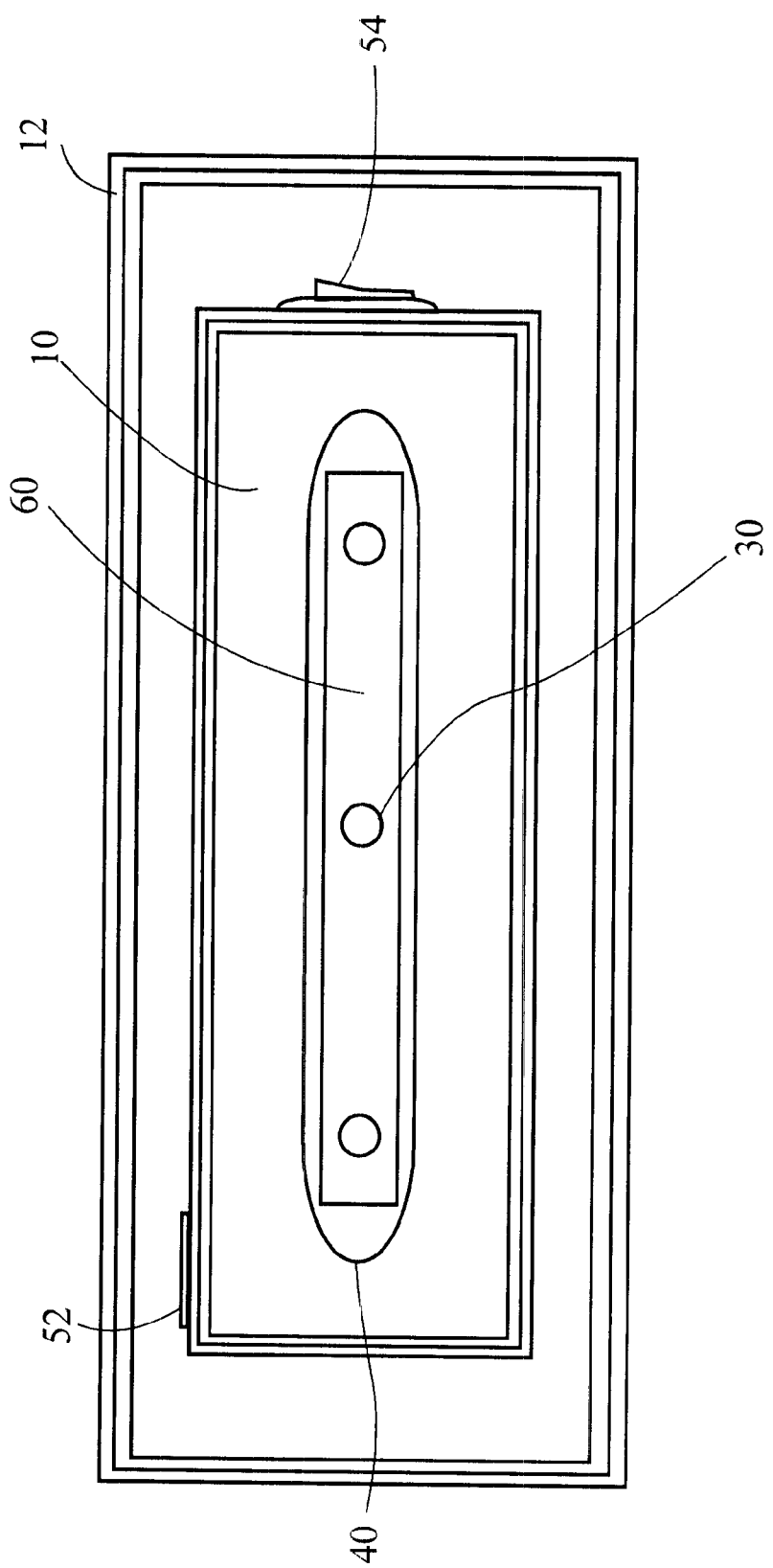
FIG. 2 is a top perspective view of the compact base unit 10 from which the acrylic panel 20 has been removed.
Figure 3:
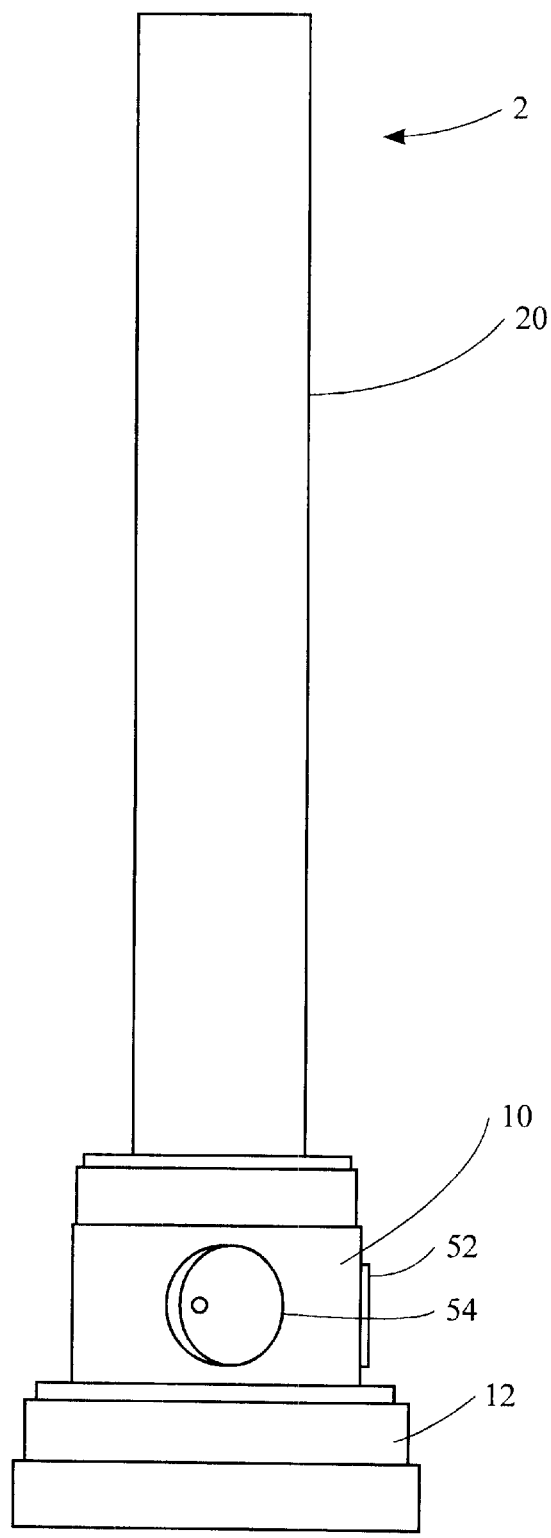
FIG. 3 is an end perspective view of the compact base unit 10 and the LED illuminated acrylic panel 20 as in FIG. 1.

FIG. 2 is a top view of the compact base unit 10 from which. the acrylic panel (not shown in FIG. 2) has been removed. FIG. 3 is an end perspective view of the compact base unit 10 and the LED illuminated acrylic panel 20. The compact base unit 10 takes the shape of a rectangular block, the top surface of which is defined by a recessed cavity 40. The cavity 40 represents a receptacle which is of a shape and dimension capable of securing the bottom segment of the acrylic panel 20 within the compact base unit 10. A circuit board (to be described) overlies the interior floor surface of the recessed cavity 40, and an upwardly-directed reflective material 60 resides on or overlies the circuit board. This way, the floor of the recessed cavity 40 becomes a reflective surface for directing light straight upward. A plurality upwardly-directed LEDs 30 are also seated on the printed circuit board (and are anchored thereon by leads which pass through the reflective material 60 and are soldered to tracks on a control circuit on the opposing side). The LEDs 30 are spaced along the bottom of the recessed cavity 40 offset slightly toward the front wall of the compact base unit 10. The forward positioning of the LEDs 30 directs the light emitted by them upward through the frosted lower peripheral border (not shown in the FIGS.) of the acrylic panel 20 wherein the negative contours of the inscribed indicia receive and reflect the light forwardly to create the aesthetically striking visual effect.

Figure 4:
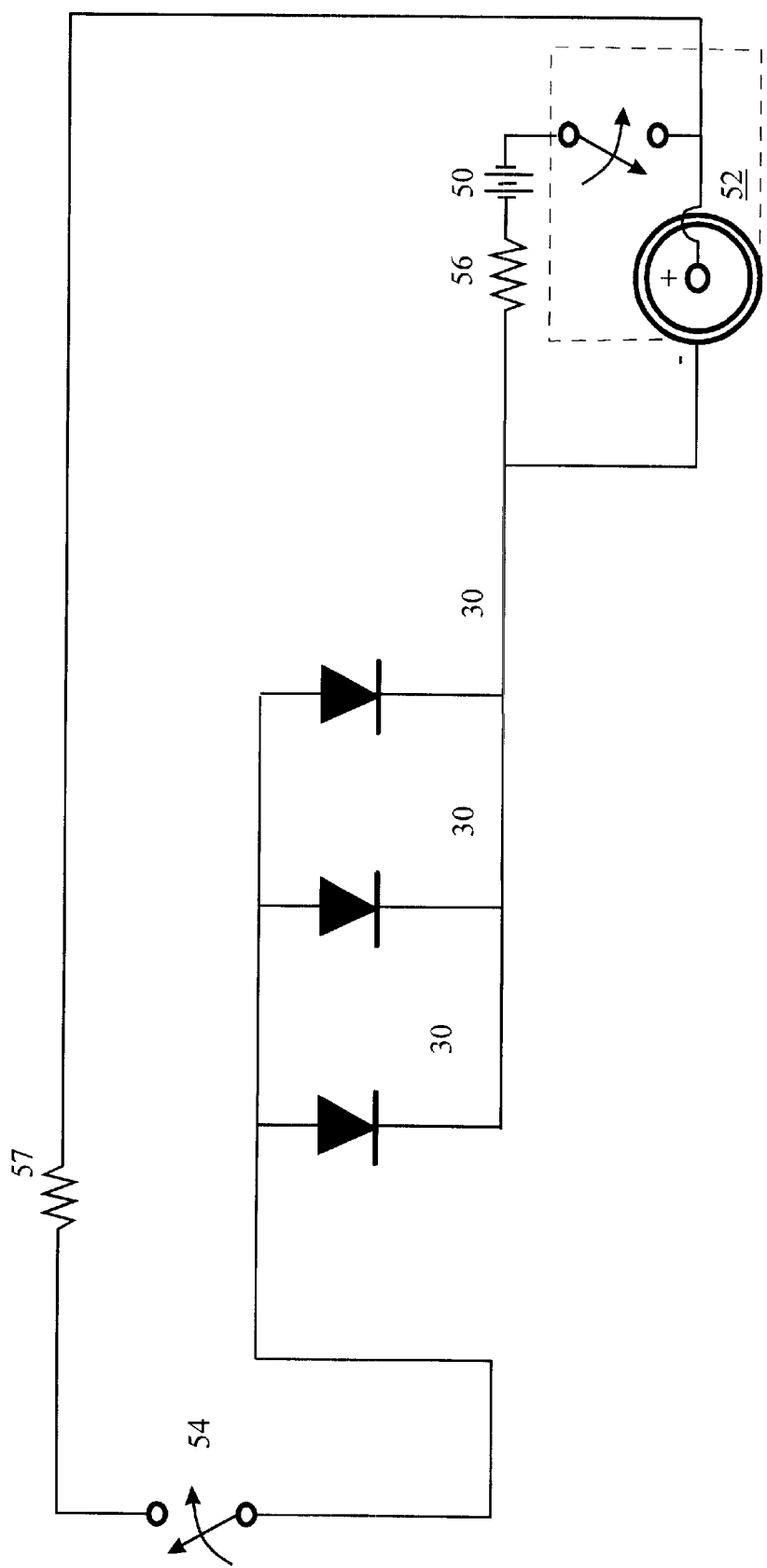
FIG. 4 is a schematic representation of the control circuit contained within the compact base unit 10 of the LED illuminated acrylic plaque.

FIG. 4 is a schematic representation of the control circuit contained within the compact base unit 10 of FIG. 1. The electrical connections for implementing the control circuit resides on a conventional printed circuit board of dimensions generally conforming to the recessed cavity 40. The control circuit includes a female receptacle 52 panel-mounted in the base unit 10 for a commercially available, direct plug-in power supply (120 V.AC. input, 4.5 V.DC. output) for use with a traditional A/C power outlet as a power source. The control circuit also comprises an integral 9 v battery 50 seated beneath the printed circuit board within base unit 10 for use as an alternative power source. Integral 9 v battery 50 is series-connected with a current-limiting resistor 56, and the series-connected resistor 56 and battery 50 are connected in parallel with female receptacle 52. The panel-mounted receptacle 52 includes an integral pressure-activated switch as shown that opens when the male plug of the plug-in power supply is inserted into the receptacle 52. This way, when power is applied via the power supply the battery power is effectively decoupled. Alternatively, when the power supply plug is removed the control circuit derives power from battery 50. A variety of suitable panel-mounted receptacles with integral pressure-activated switch are readily available commercially. Both the resistor 56/battery 50 and the female receptacle 52 are connected in series with a panel mounted switch 54, a current limiting resistor 57, and a string of three parallel-connected LEDs 30. The LEDs 30 reside atop the circuit board. The switch 54 enables the user to turn LEDs 30 on or off regardless of the power source. When the switch 54 is on and receptacle 52 is not in use, the power required to illuminate the LEDs is provided by the battery 50. When power is being supplied through the receptacle 52, the battery 50 is bypassed. Both current limiting resistors 56, 57 are mounted on the underside of the printed circuit board in the hollow of housing 10. The circuit board is situated to lie flat within housing 10, serving as the floor surface of the recessed cavity 40, and is printed with edge-contact pads at one end for ready connection to the switch 54, the battery 50, and the power receptacle 52.

The upwardly-directed reflective material 60 overlying the circuit board is preferably formed by printing or laminating a substantial area of the top of the printed circuit board with a copper sheet, and then tinning the sheet in the same fashion that individual circuit board tracks are generally tinned. This effectively provides the control circuit and reflective material 60 in a unitary component, and the entire component manufacture can be outsourced to a printed circuit board manufacturer, thereby minimizing parts and manufacturing costs. The tinned upper surface of the printed circuit board serves well as the reflective surface and directs light straight upward. The plurality LEDs 30 sit atop the tinned upper surface of the printed circuit board and are anchored thereon by their leads which pass through the tinned upper are soldered to appropriate tracks of the control circuit on the opposing side.

Alternatively, the upwardly-directed reflective material 60 may be provided separately from the circuit board in the form of an adhesive reflective tape adhered to the circuit board, or as a rectangular mirror, both of which likewise serve to reflect the light upward into the translucent acrylic panel. In the latter case of a mirror, the mirror must be cut (such as, for instance, by laser-cutting) to provide apertures to allow the LEDs 30 to protrude upward therethrough.

Figure 5:
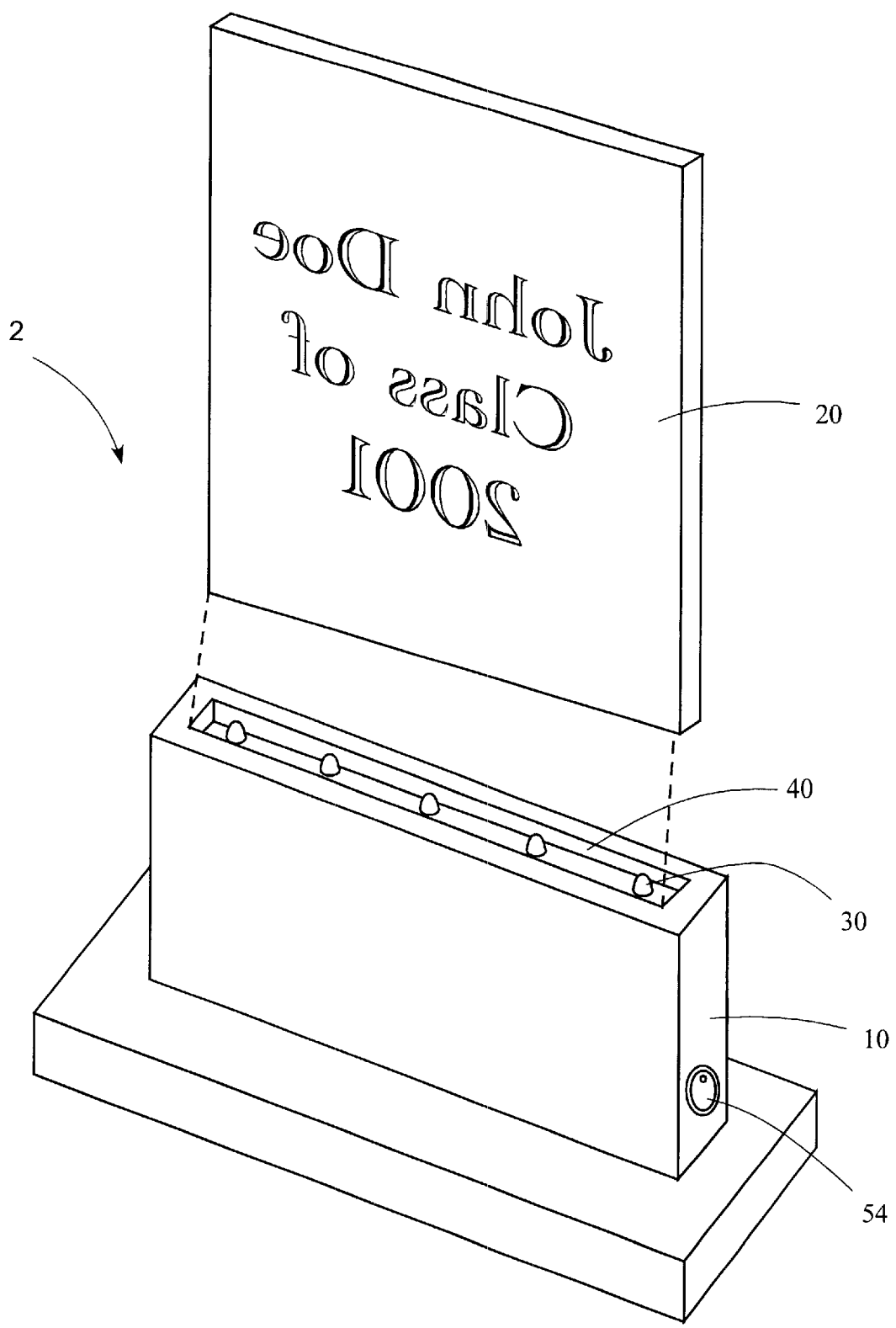
FIG. 5 is a perspective view of the LED illuminated plaque 2 showing a condition wherein the acrylic panel 20 is separated from the compact base unit 10.

FIG. 5 is a perspective exploded view of the LED illuminated plaque 2 showing the acrylic panel 20 separated from the compact base unit 10. Removed from the compact base unit 10, the acrylic panel 20 may be used as a free-standing award or a paperweight. Joined to the compact base unit 10, the acrylic panel 20 fits snugly within the recessed cavity 40 above the LEDs 30. In this assembled configuration, the acrylic panel 20 and the compact base unit 10 comprise a free standing memento displaying an aesthetically pleasing image radiating from the upright panel 20. The LEDs 30 may be turned on or off by the switch 54. The LEDs 30 may be powered by the integral battery 50 or via the A/C power receptacle 52 both shown in FIG. 4. When lit, the LEDs 30 emit light which the reflective material 60 of FIG. 2 directs upward into the edge of the acrylic panel 20. The light strikes the sidewalls of the inscribed indicia 22 of FIG. 1, and is thereafter refracted outwardly toward an observer viewing the panel 20. The light accentuated text, logos, and/or graphics improve the legibility of the memento, especially in low light conditions, and enhance the appearance of the memento under all lighting conditions.

The foregoing base unit 10 with integral LED circuit projects light along the plane of the translucent acrylic panel 20 orthogonally toward the sidewalls of laser-cut, rotary engraved, sandblasted, or burnished text, logos, and/or graphics on the rear surface of said panel 20 in order to refract the light outward toward someone viewing the panel 20, thereby presenting a very pleasing light-accentuated image of the text, logos, and/or graphics. Moreover, the translucent panel 20 itself makes for a compact and aesthetically pleasing free-standing memento.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

We claim:

1. An LED illuminated memento, comprising:
    a translucent acrylic panel having a substantially smooth and planar front face and an opposing rear face inscribed with indicia that are readable from left to right when viewed through the front face of said translucent acrylic panel;
    a base unit for securing said translucent acrylic panel in a substantially vertical position; and
    an edge lighting circuit housed within said base unit, said edge lighting circuit further comprising,
        a circuit board having a reflective top surface formed from a tinned layer integral to one side of said circuit board, and
        a plurality of LEDs seated on and directed outward from said reflective top surface.

2. The LED illuminated memento according to claim 1, wherein the indicia inscribed in said translucent acrylic panel extend inwardly into said panel and terminate centrally therein.

3. The LED illuminated memento according to claim 2, wherein said translucent acrylic panel is formed with a front face and an opposing rear face separated by peripheral side, upper and lower edges, and at least the lower edge is frosted to diffuse light.

4. The LED illuminated memento according to claim 3, wherein said base unit further comprises the shape of a block having two sets of vertically disposed sides of equal dimensions and one set of horizontally disposed sides of equal dimensions, said horizontally disposed sides forming the top and bottom surfaces of said base unit.

5. The LED illuminated memento according to claim 4, wherein the base unit is closed at the bottom by a base plate having a greater length and width than said vertically and horizontally disposed sides, thereby giving lateral, anterior and posterior stability.

6. The LED illuminated memento according to claim 5, wherein the base unit further includes a top surface defined by a recessed cavity, or slotted receptacle, for seating and securing a lower end of said translucent acrylic panel.

7. The LED illuminated memento according to claim 1, wherein said plurality of LEDs are offset toward the front of said base unit, whereby light emitted from the LEDs is directed upward by said reflective top surface toward the inscribed indicia of the translucent acrylic panel, thereby presenting a light-accentuated forward image of said indicia.

8. The LED illuminated memento according to claim 1, wherein said edge lighting circuit further comprises a battery, said LEDs being surface-mounted on said circuit board and connected by said circuit board in parallel with each other and in series with said battery.

9. The LED illuminated memento according to claim 8, wherein said edge lighting circuit further comprises a switch connected in series between said battery and LEDs, to selectively illuminate said LEDs.

10. The LED illuminated memento according to claim 9, wherein said edge lighting circuit further comprises a receptacle for coupling an A/C power supply to said LEDs as a secondary source of power.

11. The LED illuminated memento according to claim 1, wherein said translucent acrylic panel is removable from said base unit for use as a free-standing, non-illuminated memento.

12. An LED illuminated memento, comprising:
    a translucent acrylic panel having a substantially smooth and planar front face, and an opposing rear face inscribed with indicia that are readable from left to right when viewed through the front face of said translucent acrylic panel;
    a base unit for securing said translucent acrylic panel in a substantially vertical position; and
    an edge lighting circuit housed within said base unit, said edge lighting circuit including a circuit board having a plurality of LEDs directed outward from said circuit board, and a reflective top surface formed by a mirror overlying said circuit board, wherein said mirror is cut with a plurality of holes to allow said plurality of LEDs to protrude there through from said circuit board;
    whereby the edge lighting is projected upward into the translucent panel where it is reflected outward through the front surface of said panel for outward observation.

* * * * *